United States Patent [19]

Moody et al.

[11] Patent Number: 5,890,177

[45] Date of Patent: *Mar. 30, 1999

[54] METHOD AND APPARATUS FOR CONSOLIDATING EDITS MADE BY MULTIPLE EDITORS WORKING ON MULTIPLE DOCUMENT COPIES

[75] Inventors: Paul B. Moody, Londonderry, N.H.; David A. Shrum, Lawrenceville, Ga.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 638,992

[22] Filed: Apr. 24, 1996

[51] Int. Cl.⁶ .................................................. G06F 17/30
[52] U.S. Cl. .......................................................... 707/511
[58] Field of Search ................................... 707/500, 511, 707/530, 514, 515

[56] References Cited

U.S. PATENT DOCUMENTS

| | | | |
|---|---|---|---|
| 5,150,458 | 9/1992 | Masuzaki et al. | 345/435 |
| 5,280,583 | 1/1994 | Nakayama et al. | 395/200.35 |
| 5,339,389 | 8/1994 | Bates et al. | 345/331 |
| 5,581,682 | 12/1996 | Anderson et al. | 707/530 |
| 5,671,428 | 9/1997 | Muranaga et al. | 707/511 |
| 5,758,358 | 5/1998 | Ebbo | 707/203 |
| 5,806,078 | 9/1998 | Hug et al. | 707/511 |

OTHER PUBLICATIONS

*Using Frame Maker,* Frame Technology Corp., pp. 22–1 to 22–19, Sep. 1993.

*Primary Examiner*—Joseph R. Burwell
*Attorney, Agent, or Firm*—Kudirka & Jobse, LLP

[57] ABSTRACT

A document can be collaboratively edited by multiple editors by providing each editor with a separate copy of the document. Each editor then edits his own document copy using an editing application program, such as a word processor, to produce an edited copy. The edited copies are then retrieved and compared and a single marked-up document is created in which sections (for example, paragraphs) of the original document and corresponding sections of each of the edited documents (with changes from the original document indicated) are displayed in physically adjacent locations of the display screen. The displayed sections contain both edited and duplicated, unedited text. A set of "consolidation" tools are provided to quickly transfer edits between the physically adjacent areas of the screen and to make, or accept, edits made by any of the editors. A final document copy is made by eliminating the duplicate text in the sections. A unique, automated comparison routine may be used to compare the multiple edited document copies with the original document. The comparison routine can detect corresponding portions of the original and edited documents even if substantial edits have been made to the original document in the edited copies.

24 Claims, 9 Drawing Sheets

METHOD AND APPARATUS FOR CONSOLIDATING EDITS MADE BY MULTIPLE EDITORS WORKING ON MULTIPLE DOCUMENT COPIES

COPENDING APPLICATION

This application is the one of four sibling patent applications filed on an even date herewith and commonly assigned, including U.S. patent application Ser. No. 08/638,908, entitled "METHOD AND APPARATUS FOR ORGANIZING A DOCUMENT USING HIERARCHICAL ARRANGEMENT OF OBJECTS", and U.S. patent application Ser. No. 08/638,904 entitled "OBJECT ORIENTED DOCUMENT VERSION TRACKING METHOD AND APPARATUS" and U.S. patent application Ser. No. 08/637,310, entitled "METHOD AND APPARATUS FOR DISPLAYING MODELESS BAR INTERFACES IN A COMPUTER SYSTEM". The subject matter of the above-identified copending patent applications is hereby incorporated by reference.

FIELD OF THE INVENTION

This invention relates to document editing and to team document editing systems in which a group of editors cooperatively edit documents and, in particular, to a method and apparatus for consolidating all edits produced by the editors into a single document.

BACKGROUND OF THE INVENTION

Current computing applications are largely single user systems. For example, conventional editing applications allow a single user to open a file and make modifications to the content. In most cases, a file is considered an atomic unit which is not sharable. While the file is open by a first user, a second user will be prevented from opening or modifying the file. The second user is sometimes permitted to obtain a snapshot copy of the file. The snapshot copy, however, is not updated with any of the subsequent modifications made to the original copy made by the first user. Thus, the second user is unable to share in the first user's ideas manifested as file modifications. Moreover, while the file is open, the second user is prevented from modifying the content of the original file and, thus, is prevented from sharing his or her ideas manifested as file modifications. In short, the first and second user are unable to collaborate.

For example, there are many conventional word processing programs available which allow a single author to create and edit a word processing document which may contain text and embedded graphics. However, with most of these programs, the word processing document itself is not shareable. When one user has the document open and is actively editing it, another user cannot simultaneously open the same document and edit it. Typically, the second user can only make a copy of the document for editing purposes. Consequently, it is common practice to "circulate" an electronic word processing document to several editors who then make their edits on a single copy of the document. With electronic computer networks, it is easy to circulate the document among the editors. However, the original author of the document maintains little control over the marked-up copy. Editors may delete insertions made by other editors or make other changes in an uncontrolled fashion.

Alternatively, the original author can simultaneously send separate copies of the original document to each of the editors. The editors then edit their own copy individually and return the marked up copy to the author. However, after the edits are made, the task then remains to reconcile the multiple marked-up copies. This task can often be a time consuming and manual process of comparing the documents in order to locate the changes made by each editor and compare the changes with the original.

Still other collaborative word processing systems utilize a single document or a copy of a single document and allow a number of users to simultaneously "view" and edit the document such that changes made by one editor are immediately viewed by others. Such a collaborative word processor requires that all reviewers be simultaneously present to view the document and the changes made by each editor. In addition, the document view seen by all editors is the same portion of the document and, therefore, it is not possible for one editor to work on one portion of the document while the remaining editors are working on a different portion of the document. Consequently, these systems, while truly collaborative, are not efficient in the use of editor's time.

There is a need in the art for collaborative editing software. More particularly, there is a need for document editing software which makes efficient use of editor's time, yet allows rapid consolidation of the edits into a single final document.

SUMMARY OF THE INVENTION

The foregoing problems are overcome, and the foregoing need is fulfilled by an illustrative embodiment of the invention in which a document is collaboratively edited by multiple editors by providing each editor with a separate copy of the document. Each editor then edits his own document copy using an editing application program, such as a word processor, to produce an edited copy. The edited copies are then retrieved and compared and a single marked-up document is created in which sections of the original document and corresponding sections of each of the edited documents (with changes from the original document indicated) are displayed in physically adjacent locations of the display screen. A set of "consolidation" tools are provided to quickly transfer edits between the physically adjacent areas of the screen and to make, or accept, edits made by any of the editors. Edits which are not accepted can also be easily deleted. The result is a single consolidated document containing the edits which are desired by the original author of the document.

In a preferred embodiment, a unique, automated comparison routine is used to compare the multiple edited document copies with the original document. The inventive comparison routine can detect corresponding portions of the original and edited documents even if substantial edits have been made to the original document in the edited copies.

DETAILED DESCRIPTION OF THE PREFERRED EMBODIMENT

Figure 1:
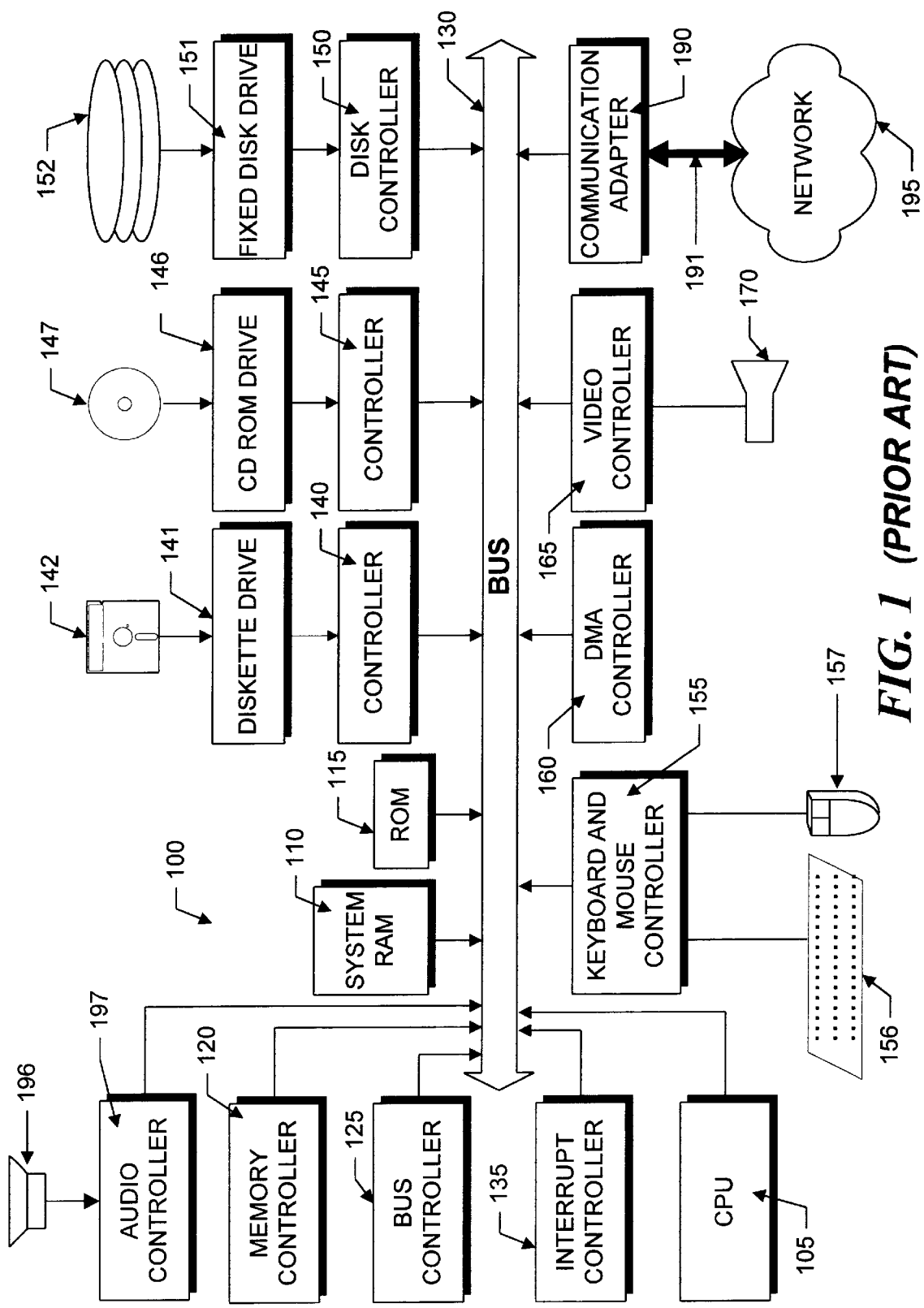
FIG. 1 is a schematic block diagram of a conventional computer system in which a preferred embodiment of the invention may execute.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tablet may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2®, UNIX and DOS, etc. One or more applications such as word processors, editors, spread sheets, compilers, etc., execute in order to control the operating system. If operating system is a true multitasking operating system, such as OS/2, multiple applications may execute simultaneously.

Figure 2B:
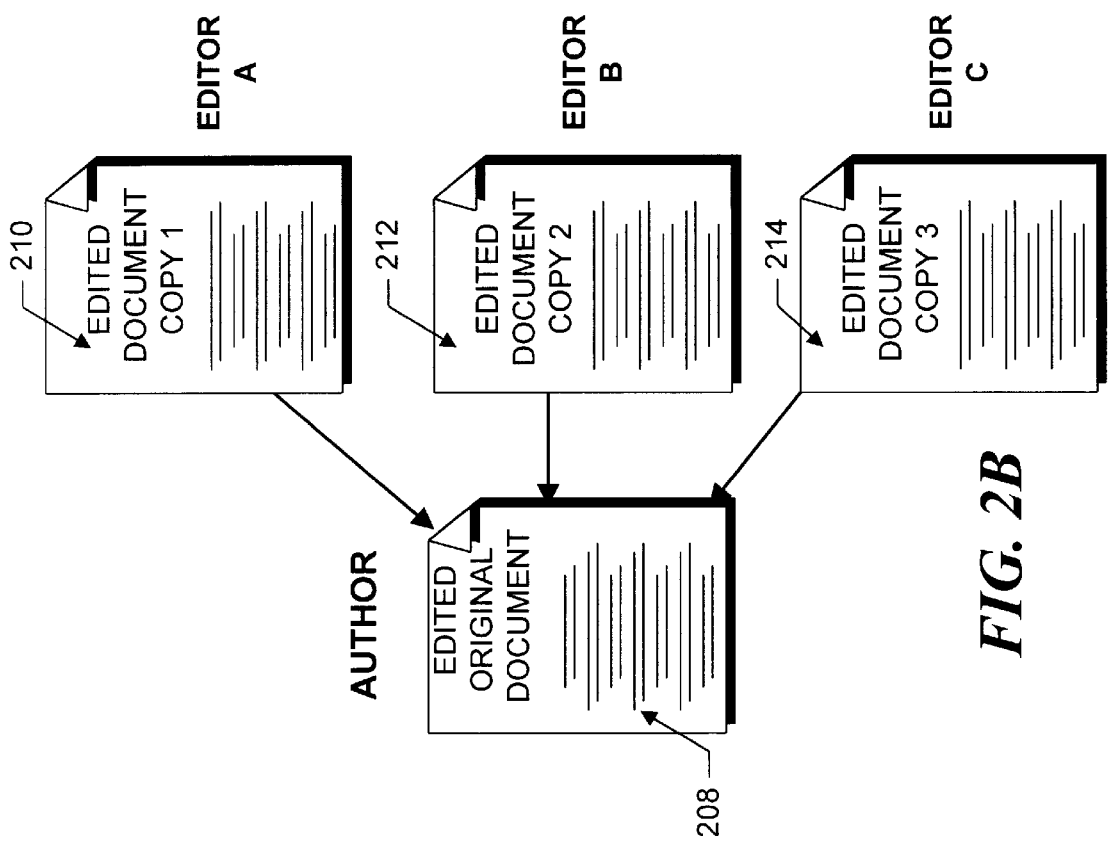
FIGS. 2A and 2B illustrate the beginning steps of an illustrative editing session in which an original copy of a word processing document generated by an author is first sent to, and then reviewed by, three editors and then the edited copies are consolidated into a single final document.
Figure 2A:
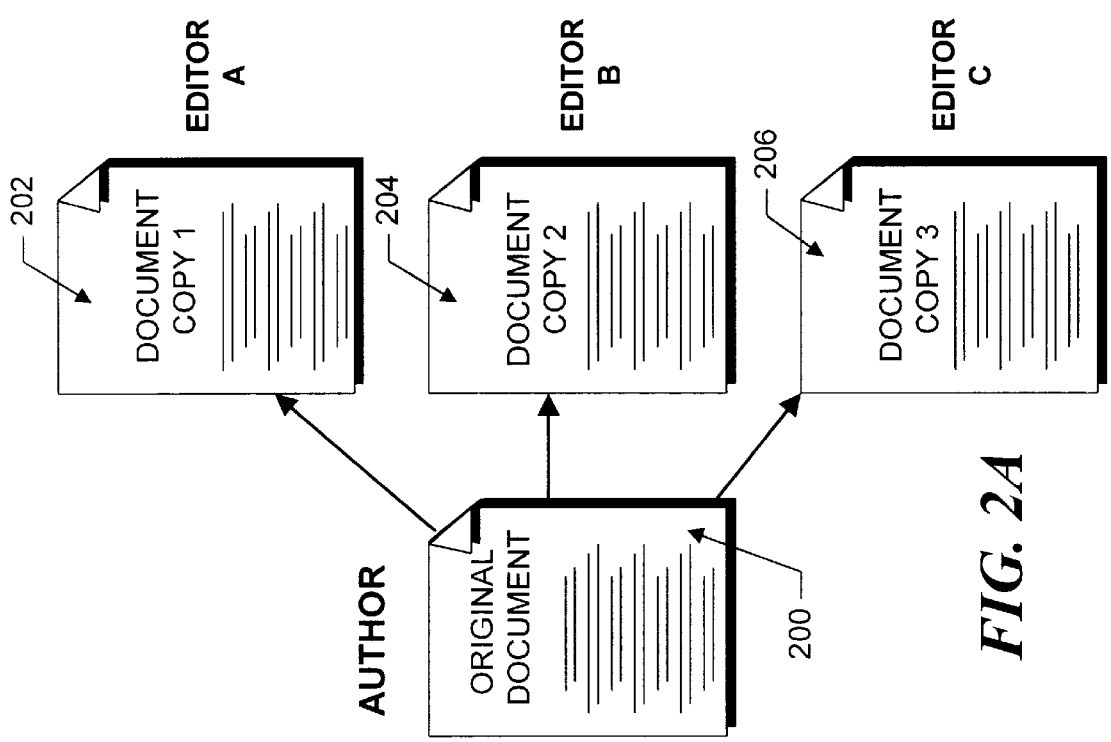

FIG. 2 illustrates a typical situation in which the inventive apparatus and method can significantly increase efficiency of a document review and consolidation process. The scenario illustrated in FIGS. 2A and 2B occurs when an author creates an original document and has the original document reviewed by other editors. The author then gathers the edits and consolidates the edits to produce a final document. While such a document review process represents the most likely use for the present invention, it is also possible, for example, to compare separate documents using the inventive apparatus and method. Consequently, although the discussion which follows is limited to a document review process, the invention should not be considered as so limited.

FIG. 2A illustrates the first stage in a document review process where an author creates an original document 200 using, for example, any one of a number of known word processing programs. Such word processing programs include the Lotus WordPro® word processing program, 96 Edition, commercially available from Lotus Development Corporation, Cambridge, Mass., a subsidiary of International Business Machines Corporation, the assignee of the present invention. After producing the document, the author desires to obtain comments from three review editors, which comments the author will then consider in order to produce a final document. Accordingly, the author makes three copies, 202, 204 and 206, of the document 200 as shown in FIG. 2A. These copies are then transmitted to the three editors, Editor A, Editor B and Editor C. The copies can be transmitted over a local area network, via the internet, e-mail or simply placed on a floppy disk and given to the editors.

The author and each of the editors can then edit his own individual copy of the document using word processing programs, such as the aforementioned WordPro® word processing program. The individual editors need not use the same word processing program in order to use the principles of the present invention.

After each of the editors and the author have edited the original document, the author is ready to consolidate the edited copies to produce the final document. The edited copies, 210, 212 and 214, are returned by the editors to the author as shown schematically in FIG. 2B. In particular, edited copies 210, 212 and 214 can be returned to the author by means of e-mail or other electronic transmission or by returning to the author a floppy disk with the edited copy.

In accordance with the principles of the invention, the edits in the edited copies 210, 212 and 214 are combined or consolidated with the edited original document 208 to produce a final document. If the individual editors have used a word processing program different from the aforementioned WordPro® program, the edited copies are first converted into a WordPro® format using conventional format translators or filters. In the case of edits made in word processing programs other than WordPro®, a comparison between the documents can still be made, but the identity of the individual editors who made comments may not be available.

Figure 3:
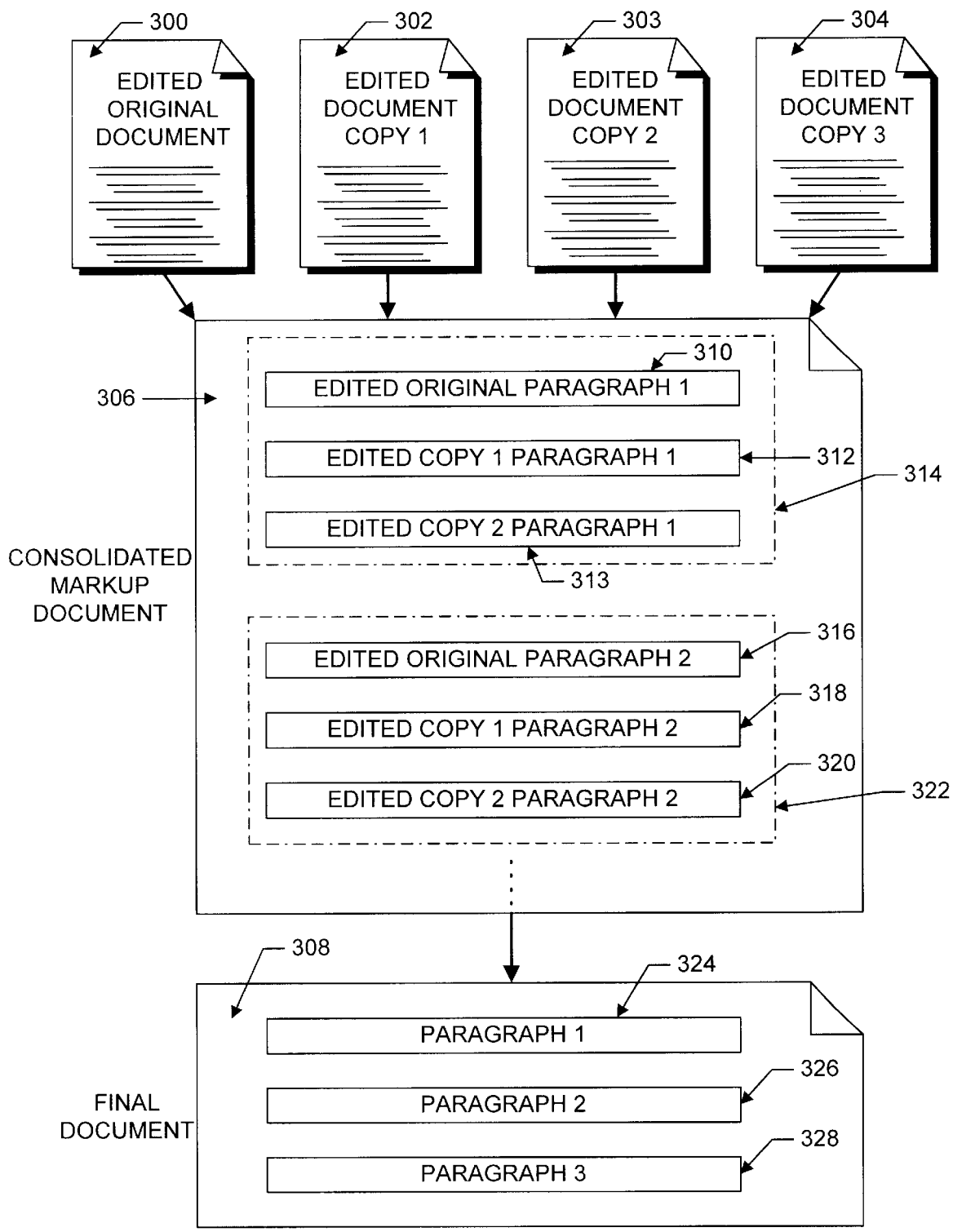
FIG. 3 schematically illustrates the process of consolidating changes in each of the edited document copies into a consolidated marked-up copy and generation of a final document copy.

The mechanism by which the consolidation is performed is shown schematically in FIG. 3. In particular, the production of the final document 308 is conducted in two steps. In the first step, the edited original document 300 and the edited copies 302–304 are combined into a consolidated markup document 306.

In general, the process of making the consolidated markup document 306 involves dividing the edited original document 300 into a number of "divisions (i.e., "sections")." These divisions may be arbitrary divisions or natural divisions of the document. For example, in the case of a text document, such as that produced by a word processing program, a natural division could be a paragraph. In the following discussion, division of the document into paragraphs will be assumed so that comparisons in the original document with the edited document copies are done at the paragraph level. However, in the case of text documents, it is not necessary that paragraphs be used as the comparisons can be done at the line, word, page or any document division level.

In accordance with the principles of the invention, the edited original document 300 is compared sequentially to each of the documents 302, 303 and 304. Since each of the documents may contain edits to any of the paragraphs, the comparison cannot be an exact match but is performed in accordance with a procedure described below.

When "matching" paragraphs are found in the edited original document and a copy, for example, copy 302, the edits are displayed on the display screen. If the author is comparing only one other edited copy against the original document, then the original document paragraphs are displayed and editor's changes are marked in the original document paragraphs without making copies of the entire edited paragraphs. For example, if an editor simply added the word "very" to the following sentence:

Now is the time for all good people to come to the aid of their country.

The consolidated markup copy would display:

Now is the time for all very good people to come to the aid of their country.

In the case of the aforementioned WordPro® word processor, each editor can be assigned particular font attributes and colors. In this case, the word "very" would be displayed in whatever font and attributes (bold, italic, underline, etc . . .) and text color is that the particular editor who added the word "very" was assigned. Each document contains a list of editors and each editor can also have different font attributes for their revision deletions (things they have deleted from the document) and revision insertions (things which have been added to the document.)

If the author compares more than one edited copy against the original document then the display of the edits is changed from the display described above. As illustrated in FIG. 3, a copy of each edited copy paragraph is displayed along with the corresponding original paragraph when the edited copy paragraph is different from the original paragraph. When reviewing the changes, the duplicated paragraphs allow the author to see the edits in the different versions of the edited paragraphs in context. Each paragraph has a special tag at the beginning of the paragraph with the editor's initials and a number indicating a paragraph set to which the paragraph belongs. The special tag is "owned" by one of the editors. The editor who "owns" the special tag is determined by identifying the first revision insertion in the paragraph and assigning the editor who made the revision insertion the ownership of the special tag. If there are no revision insertions, then the paragraph is examined for the first revision deletion and the editor who made that revision deletion is assigned the ownership of the special tag. If there are no revision insertions or deletions, then an editor must have inserted a entirely new paragraph so the editor who is assigned the first character of the paragraph is also assigned the ownership of the special tag.

For example, if Editor 1 (with initials "AB") added the word "very" to a sentence and Editor 2 (with initials "CD") deleted the word "good", then the following paragraphs would be displayed:

Original:1 Now is the time for all good people to come to the aid of their country.

AB:1 Now is the time for all very good people to come to the aid of their country.

CD:1 Now is the time for all good people to come to the aid of their country.

The special tags "Original 1", "AB 1" and "CD 1" are assigned as described above. The number "1" which is appended to each tag indicates that the three paragraphs are a set. In a preferred embodiment, the paragraphs in a paragraph set are displayed in physically adjacent locations on a display screen. For example, if it is found that an original paragraph 1 in the document 300 corresponds to an edited paragraph in document 302, the original paragraph 310 (which may or may not be edited) is displayed physically adjacent to the edited document copy 1 paragraph 1 (312). The three paragraphs in the paragraph set indicated schematically by dotted box 314 are not only displayed together, but are also marked in some manner (such as by appending a number to the paragraph tags), both internally and externally, to indicate that they are part of a set. Internally, the paragraph set is marked to allow the word processing program to process the set as a group in order to delete duplicate paragraphs to create the final document.

In addition, the differences between paragraph 310 and paragraph 312 are preferably visibly indicated in paragraph 312. For example, the differences can be indicated using conventional "redlining" techniques. In accordance with known redlining techniques, portions of paragraph 310 which are deleted in paragraph 312 may be indicated by strikeouts in paragraph 312. Insertions in paragraph 312 may be indicated by highlighting or underlining text in paragraph 312 or in another conventional manner.

In a similar manner, each of the paragraphs in the edited original document 300 is compared to the edited document copy 2 303 containing the edits by the second editor. If edited paragraph copies corresponding to original paragraphs are found in the second edited document, they are included with the paragraph sets containing the original document paragraph and any edited paragraph from edited document copy 1. In this manner paragraph 313 is included in the paragraph set 314. Another three paragraph set is denoted by dotted box 322. This set contains an original edited paragraph 2 and edited copies of the paragraph from document copies 1 and 2. A similar comparison process is performed with edited document copy 3 against the original document 300.

When the comparison process is completed, the consolidated markup document will consist of a plurality of paragraph sets. Each paragraph in the original document will be included in a set together with edited paragraphs from each of the edited copies. If a paragraph is deleted in entirety in one of the edited copies, that paragraph will still appear in the appropriate set, but marked as deleted (by means of strikeouts or other suitable denotations.) Some paragraph sets may not include an original paragraph if one of the editors added a new paragraph.

After all of the paragraph sets have been identified and displayed, the author can examine the consolidated document 306 and determine which, if any, of the edits generated by the different editors he wishes to include in the final document. Since the paragraphs are part of a conventional word processing document, the word processing software can be used to make the edits. In particular, edits found in any of the paragraphs can be transferred into the original paragraph 1. Alternatively, an edited paragraph such as paragraph 312 can be selected and the edits "accepted" or made in the original paragraph 310 automatically. If edits are associated with an editor ID then edits made by a particular editor can be accepted automatically.

At the end of the consolidation procedure, a final document 308 can be produced from the consolidated markup document 306 by eliminating the duplicate paragraphs. Since each of the paragraph sets is marked, the duplicate elimination procedure is straight forward (the first paragraph is retained, the remaining paragraphs are deleted.) The final document 308 contains one copy of each of the paragraphs, for example, paragraphs 1–3 (324–328) and any other paragraphs found in the original document or added by an editor.

Figure 4A:
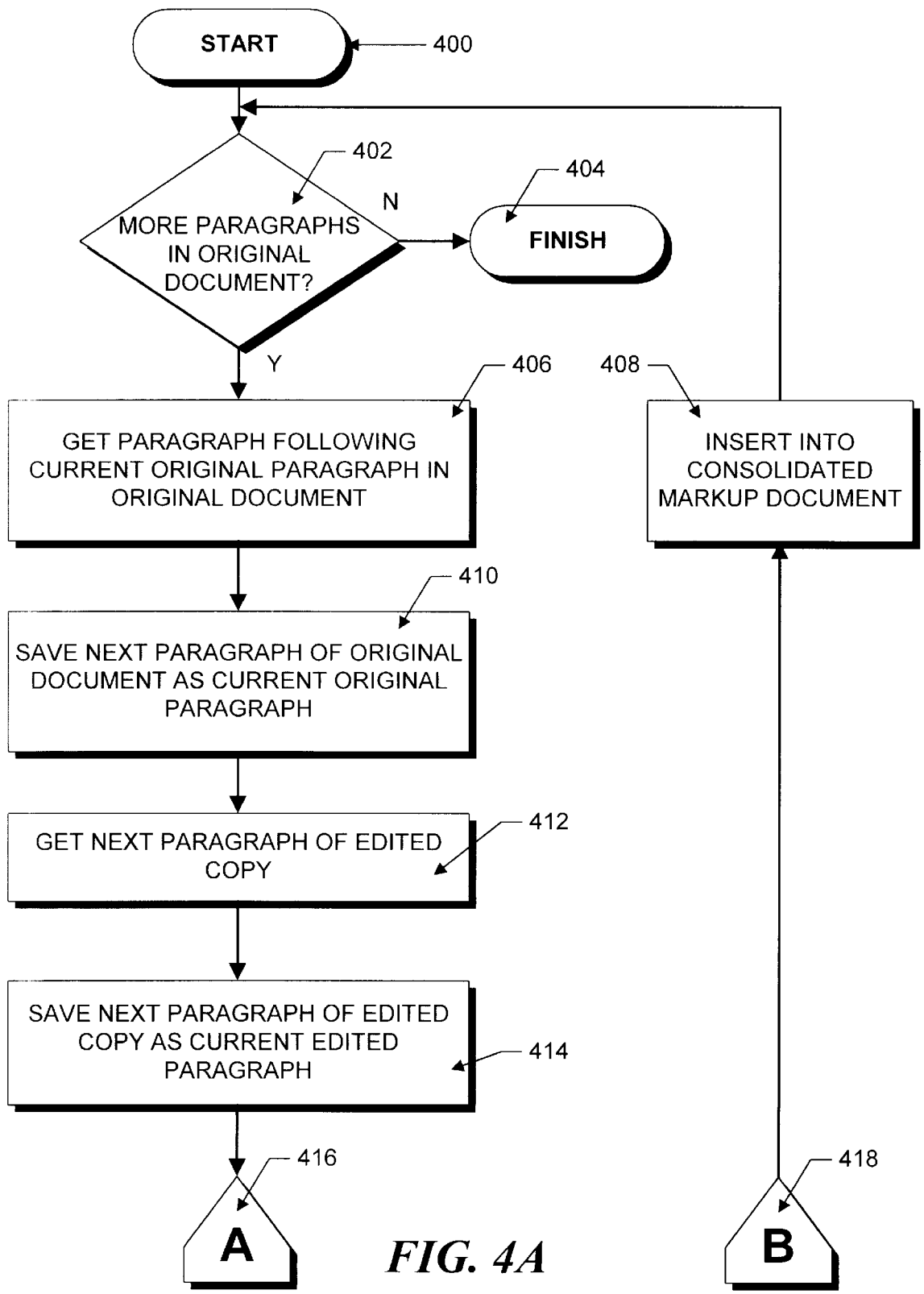
FIGS. 4A–4C, when placed together, form a flowchart of an illustrative software routine which compares the original document to an edited copy to determine the location and nature of changes.
Figure 4B:
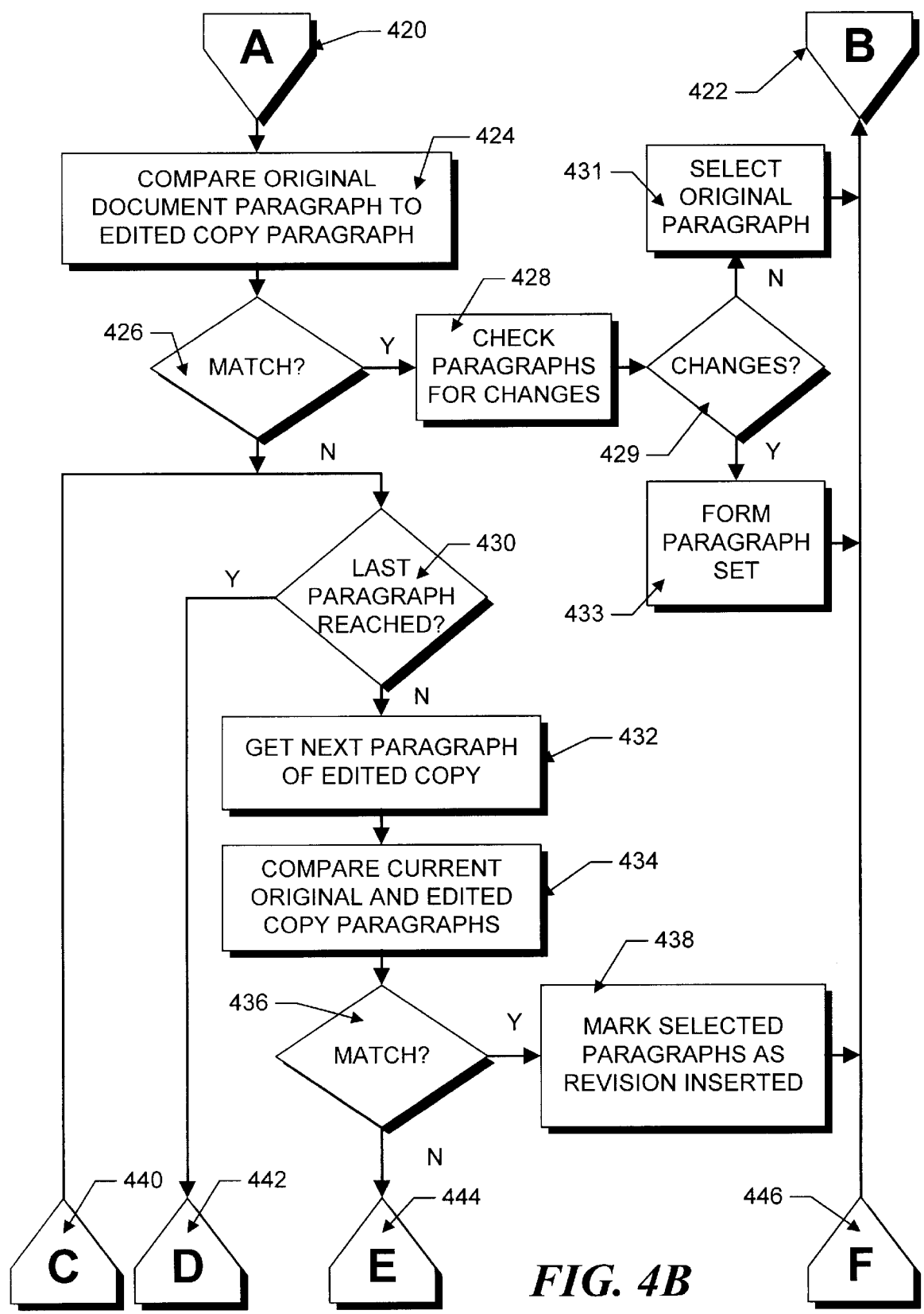
Figure 4C:
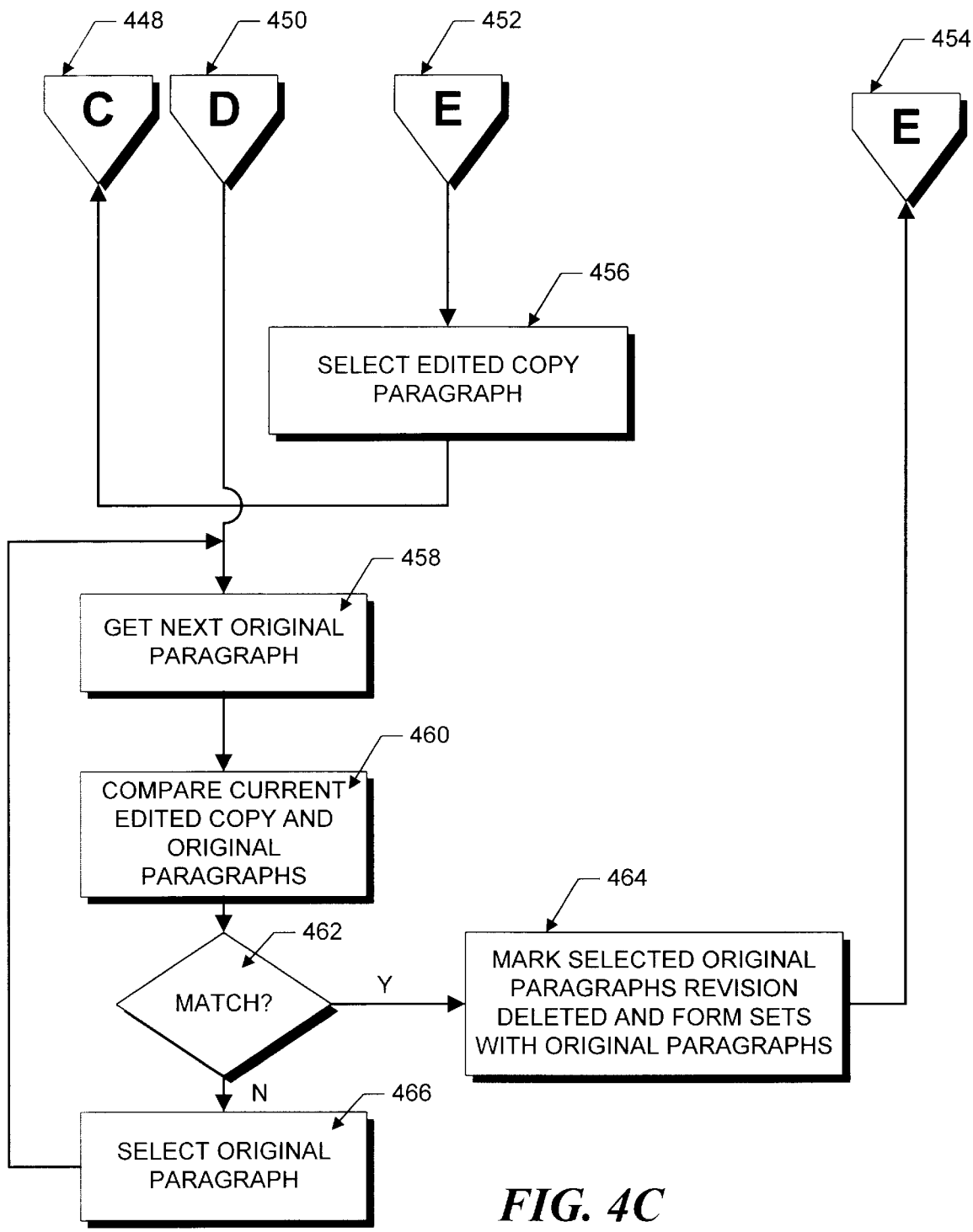

As previously mentioned, paragraphs in the original document and the edited copies cannot be compared by looking for exact matches, due to the edits. FIGS. 4A–4C illustrate an exemplary routine which can be used to compare paragraphs. The same routine is used for comparing just one edited copy against the original document and for comparing more than one edited copy against the original document. The only difference is that when a comparison is made of more than one edited copy against the original document, each of the edited copies are compared against the original text of the original document and any revision insertions or revision deletions from earlier comparisons are ignored. For example, when comparing two edited copies, against the original document, the edited copies are compared sequentially, as discussed above, If a difference is found when comparing the first of the two edited copies, as discussed above, that difference is marked in the original paragraph. However, that marked difference is then ignored when comparing the second of the two edited copies against the original document.

The comparison routine begins at step 400 in FIG. 4A. In steps 402–426 the routine loops through the original document paragraphs and compares each of them to the first edited copy paragraphs. Assuming the first original document paragraph "matches" the first edited copy paragraph, then the routine moves on to compare the original document second paragraph against the edited copy second paragraph. The process of determining whether the paragraphs "match" is discussed in more detail in connection with FIG. 5 below.

In particular, from step 400 the routine proceeds to step 402 in which a determination is made whether any further paragraphs remain to be examined in the original document. If not, the document comparison is completed and the routine ends in step 404. Assuming additional paragraphs remain to be compared the routine proceeds to step 406 in which the "next" paragraph of the original document is retrieved from the memory. The "next" original document paragraph is the paragraph following the "current" paragraph. The "current" paragraph is the paragraph reached at the present stage of the compare process. In step 410, the "next" paragraph is marked as the "current" paragraph. In steps 412 and 414, the "next" paragraph of the edited copy is retrieved and marked as the "current" edited paragraph.

The routine then proceeds, via off-page connectors 416 and 420, to step 424 in which the current paragraphs in the original and edited copy are compared. In step 426 the paragraphs are checked for a "match." If the paragraphs match, then the edited copy paragraph is checked in step 428 for changes from the original paragraph. If changes are detected in step 429 they are marked and a set is formed from the original paragraph and the marked edited copy paragraph in step 433 and the routine proceeds, via off-page connectors 422 and 418, to step 408. In step 408, the paragraph set is inserted into the consolidated markup copy and the routine proceeds to step 402 to determine if any further paragraphs exist.

Alternatively, if, in step 429, it is determined that the edited copy paragraph has no changes from the original, then the original paragraph is selected in step 431 and displayed in step 408. The identical paragraph from the edited copy is not displayed to avoid duplication and screen clutter. The routine then proceeds to step 402 to determine if any further paragraphs exist.

If the original document current paragraph does not "match" the edited copy current paragraph, then the routine compares the original document current paragraph against other paragraphs in the edited copy as illustrated in steps 430–456. In particular, if, in step 426, it is determined that no match exists, the routine proceeds to step 430 in which a check is made to determine whether all paragraphs of the edited copy have been retrieved. If not, a new paragraph from the edited copy is retrieved in step 432. The new paragraph is compared against the current original paragraph in step 434 and a match is detected in step 436.

If, in step 436, no match is detected, the routine proceeds via off-page connectors 444 and 452 to step 456 in which the edited copy paragraph is selected or marked in some manner. The routine then proceeds, via off-page connectors 450 and 442, back to step 430 to determine whether the last paragraph of the edited copy has been reached. Operation proceeds in this manner until either a match is detected in step 436 or the last paragraph is reached in step 430.

If a match is detected in step 436, then the editor has added some new paragraphs to the edited copy. In this case, copies are made of the paragraphs selected in step 456 and these copies are marked as revision inserted in step 438. The routine then proceeds to step 408, via off-page connectors 422 and 418 where the marked paragraphs are inserted into the consolidated markup copy.

However, if the last paragraph of the edited copy is reached as indicated in step 430 and no match has been found, then the routine proceeds, via off-page connectors 442 and 450, to step 458 where the edited copy current paragraph is compared against all other paragraphs in the original document. This process is illustrated in steps 458–464.

In particular, if the last paragraph of the edited copy is reached as determined in step 430, the next paragraph of the original document is retrieved in step 458 and compared to the current edited paragraph in step 460.

If, in step 462, a match is not detected, the original paragraph is selected or marked in step 466 and the routine proceeds back to step 458 to retrieve the next original paragraph. Operation continues in this manner until a match is detected in step 462. At this point the routine has determined that the editor has deleted some paragraphs from the original document in the edited copy. In step 464, copies of the selected original paragraphs are made and marked as revision deleted. These copies are paired with the original paragraphs to indicate the changes. The routine then proceeds, via off-page connectors 454, 446, 422 and 418 to step 408 whether the paragraph copies are inserted into the consolidated markup document. In step 402, the routine continues until all paragraphs of the original document are checked and the routine finishes in step 404.

Figure 5A:
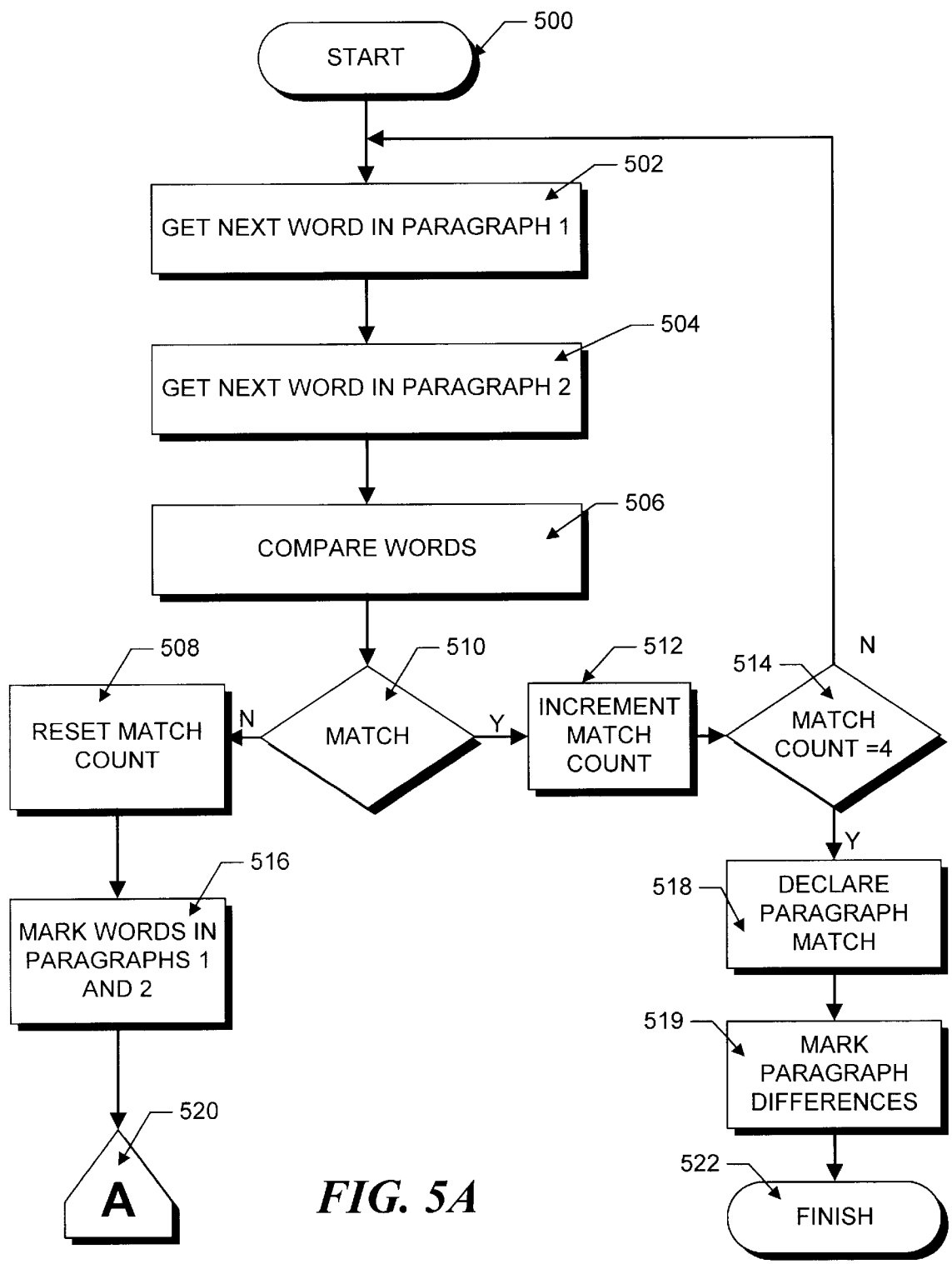
FIGS. 5A–5C, when placed together, form a flowchart of an illustrative software routine which is used to compare two paragraphs of a word processing document for edits.
Figure 5B:
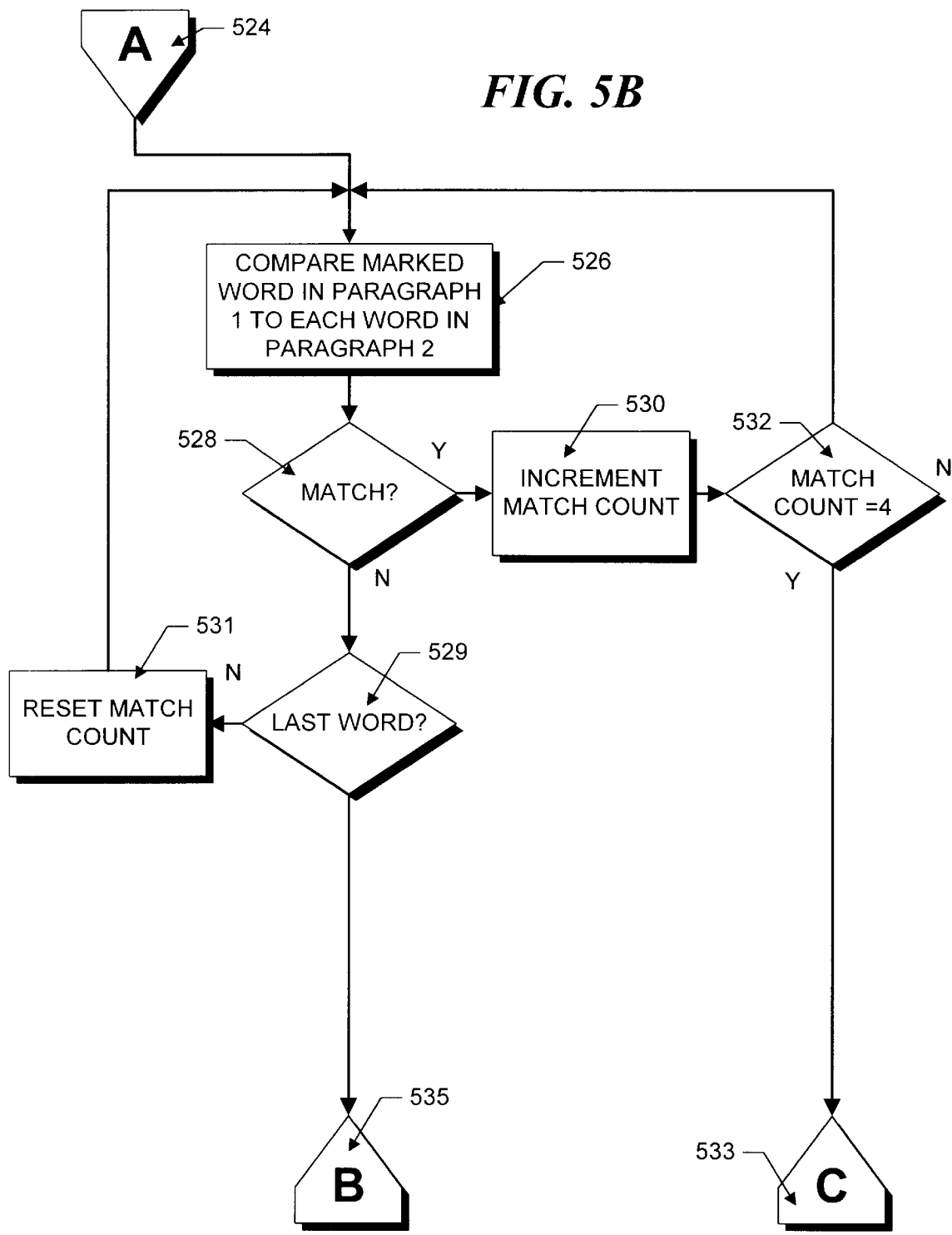
Figure 5C:
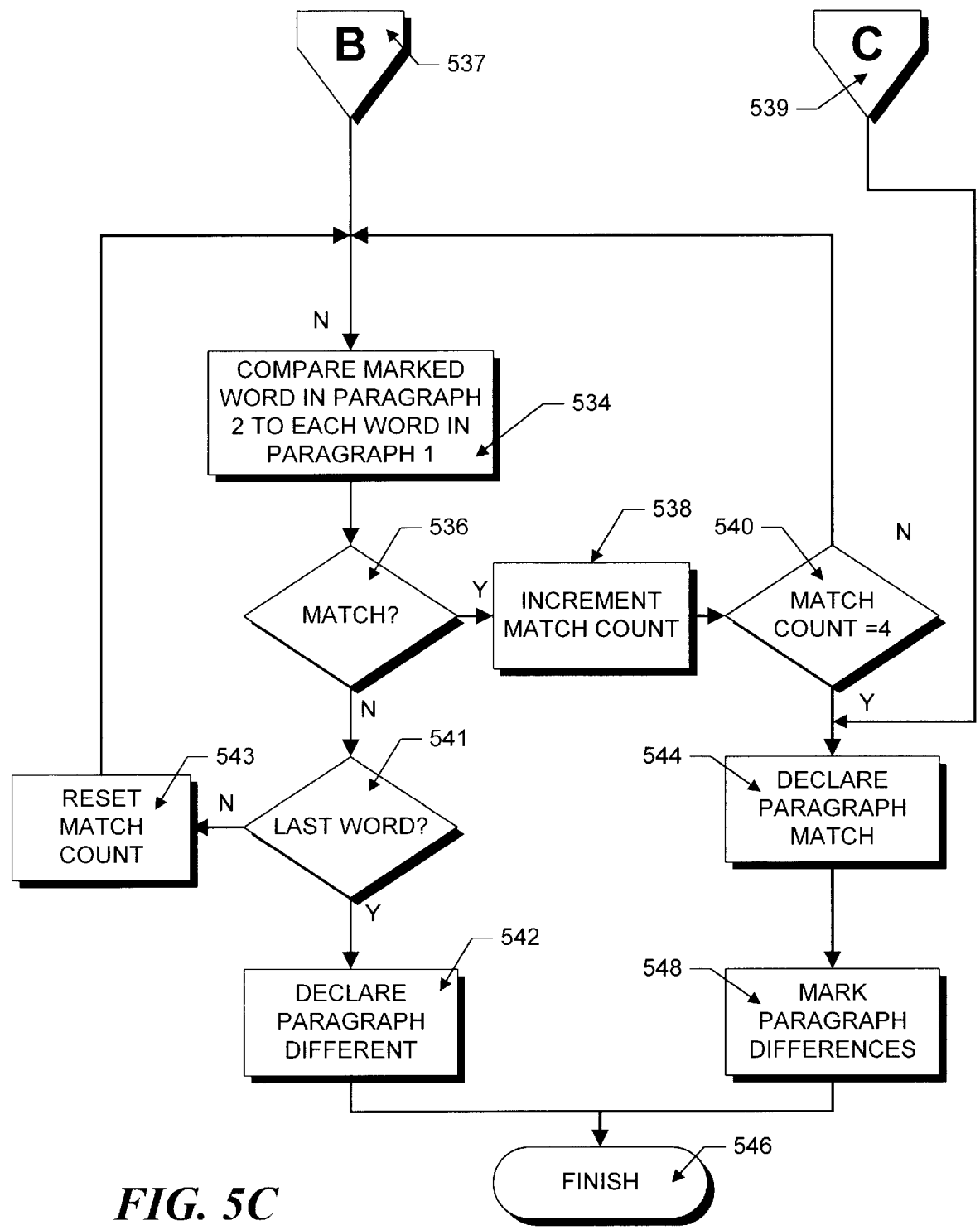

The process of comparing one paragraph against another paragraph to see if they are the same or similar enough that we consider them the same paragraph from the two documents is illustrated in FIGS. 5A–5C. In the following discussion, it will be assumed that Paragraph 1 is a paragraph from the original document, and Paragraph 2 is a paragraph from an edited copy.

The routine begins in step 500 and proceeds to steps 502 and 504 in which the next words in paragraphs 1 and 2 are retrieved. Text followed by a white space is considered a "word" for these retrievals. These retrieved words are then compared in step 506 and a match is checked in step 510. To perform the comparison the routine only examines textual characters; font attributes, which simply make the words look different, are ignored. If a match is detected a match count is incremented in step 512.

In step 514, the routine counts how many words have matched. If four consecutive words match, then the paragraphs are similar enough to count them as a match for the previously described document comparison. In this case, a match is declared in step 518. The routine continues on to determine whether any differences exist between the words in paragraph 1 and paragraph 2. If differences exist they are marked in paragraph 2 as indicated in step 519. The routine finishes in step 522.

If, in step 510, it is determined that words that don't match before four consecutive words are detected, then the match count is reset in step 508 and the words being considered in Paragraph 1 and Paragraph 2 are marked in step 516.

In order to continue, the routine uses the same comparison process as previously used for paragraphs, but instead compares words. In particular, the routine proceeds, via off-page connectors 520 and 524, to step 526 where the marked word in Paragraph 1 is compared to each word in Paragraph 2 in order to get "re-synched". If a match is detected in step 528, the routine also must detect at least four consecutive words that match. This process is illustrated in steps 530 and 532. In step 530, upon the detection of a match, a match count is incremented. If four consecutive words match as determined in step 532, then the routine proceeds, via off-page connectors 533 and 539 to step 544 where a paragraph match is declared. The routine continues searching for, and marking, differences in the two paragraphs until the end of the paragraph is reached in step 548. The routine then ends in step 546.

Alternatively, if the comparisons performed in step 526 do not yield four consecutive words that match, then the routine proceeds to step 529 in which a check is made to determine if the end of the paragraph has been reached before four consecutive matches are found. If the last word in the paragraph has not been examined, the match count is reset in step 531 and the routine returns to step 526 to continue checking for four consecutive matches.

If the end of the paragraph is reached before four consecutive matches are detected as determined in step 529, the routine proceeds, via off-page connectors 535 and 537 to step 534 in which the marked word in Paragraph 2 is compared to each word in Paragraph 1. The presence of four consecutive words that match is detected in steps 538 and 540. If four consecutive words match, then the routine proceeds to step 544 where a paragraph match is declared, further differences are detected and marked in step 548 and the routine ends in step 546.

Alternatively, if four consecutive words that match are not detected, the routine checks for the end of the paragraph in step 541. If the end of the paragraph has not been reached, then the match count is reset in step 543 and the routine returns to step 534 to continue checking for four consecutive matches.

Alternatively, if the end of the paragraph has been reached as determined in step 541 before four consecutive word matches have been found, then non-matching paragraphs are declared in step 542 and the routine finishes in step 546.

If the routine in FIGS. 5A–5C determines that Paragraphs 1 and 2 are similar enough for a match, then a separate routine (not shown) examines Paragraph 1 and Paragraph 2 looking for embedded objects. For example, these objects can consist of a table embedded in a paragraph or a text frame that contains some text. The routine which examines the paragraphs for embedded objects is only performed if it is determined that the original document and the edited copy have the same "heritage". or the edited copy is a continuation of the original document. Heritage is determined by storing, at the time of creation, a creator ID for the creator of the document and a timestamp indicating when the document was created. If both the creator ID and the timestamp match for the original document and the edited copy, then the documents are checked for embedded objects.

If embedded objects are discovered, the object ID for each embedded object is checked. If two embedded objects have the same timestamp, then they are the same embedded objects in the original and edited copy documents. The contents of the two embedded objects are then compared using the same process as described with paragraphs. In particular, the stream of paragraphs within the frame or table are compared in the same manner as a stream of paragraphs in two documents are compared as illustrated in FIGS. 4A–4C.

Although only one embodiment of the invention has been disclosed, it will be apparent to those skilled in the art that various changes and modifications can be made which will achieve some of the advantages of the invention without departing from the spirit and scope of the invention. For example, alternative comparison routines could be used to compare paragraphs. These and other obvious modifications are intended to be covered by the appended claims.

What is claimed is:

1. An apparatus for producing a formal document from a first document and a second document in response to user commands, the apparatus comprising:

means responsive to a user command for comparing the first document with the second document in order to identify a first section of the first document which contains unedited portions identical to portions of a second section of the second document;

means responsive to the comparison of the first and second documents for creating a consolidated document which displays both edited and unedited portions of each of the first and the second sections;

means responsive to the creation of the consolidated document for determining changes between the first section and the second section;

editing means controlled by user commands for selecting desired changes to be made in the first section from the determined changes; and means responsive to a user command for forming a final document which includes the unedited portions of the first section and the selected desired changes.

2. The apparatus according to claim 1 wherein the editing means comprises:

means for displaying the first section on a display screen;

means for displaying the second section on the display screen in a location physically adjacent to the display location of the first section; and means for visually displaying the determined changes in the second section display.

3. The apparatus according to claim 1 wherein the comparing means comprises means for dividing the second document into a plurality of edited sections and second means for comparing each of the plurality of edited sections to the first section.

4. An apparatus for producing a final document from an original document and an edited copy of the original document in response to user commands, the apparatus comprising:

means responsive to a user command for comparing a first section of the original document with the edited document copy in order to identify a second section of the edited document copy which was a copy of the first section before editing;

means responsive to the identification of the second section for creating a consolidated document which simultaneously displays both edited and unedited portions of each of the first and the second sections;

means responsive to the creation of the consolidated document for determining changes between the first section and the second section;

editing means controlled by user commands for selecting desired changes to be made in the first section from the determined changes; and means responsive to a user command for forming the final document which includes the unedited portions of the first section and the selected desired changes.

5. The apparatus according to claim 4 wherein the editing means comprises:

means for displaying the first section on a display screen; and means for displaying the second section on the display screen in a location physically adjacent to the display location of the first section; and means for visually displaying the determined changes in the second section display.

6. The apparatus according to claim 4 wherein the comparing means comprises means for dividing the edited document copy into a plurality of edited sections and second means for comparing each of the plurality of edited sections to the first section.

7. The apparatus according to claim 6 wherein the first section and each of the plurality of edited sections is comprised of subsections and wherein the second comparing means compares the subsections in the first section with the subsections in each of the plurality of edited sections.

8. The apparatus according to claim 7 wherein the comparing means is responsive to a match of a predetermined number of adjacent subsections for determining that one of the plurality of edited sections was a copy of the first section before editing.

9. The apparatus according to claim 4 wherein the creating means creates a consolidated document by inserting the second section into the consolidated document immediately after the first section.

10. The apparatus according to claim 4 wherein the first and second section are marked as a pair of sections.

11. The apparatus according to claim 10 wherein the editing means comprises means responsive to a user command for changing the first section to incorporate at least one of the changes in the second section.

12. A method for producing a final document from a first document and a second document in response to user commands, the method comprising the steps of:

(A) comparing the first document with the second document in response to a user command in order to identify a first section of the first document which contains unedited portions identical to portions of a second section of the second document;

(B) creating a consolidated document which displays both edited and unedited portions of each of the first and the second sections;

(C) determining changes between the first section and the second section;

(D) selecting desired changes to be made in the first section from the determined changes, in response to user commands; and (E) forming a final document which includes the unedited portions of the first section and the selected desired changes.

13. The method according to claim 12 wherein step D comprises the steps of:

(D1) displaying the first section on a display screen;

(D2) displaying the second section on the display screen in a location physically adjacent to the display location of the first section; and (D3) visually displaying the determined changes in the second section display.

14. The method according to claim 12 wherein step A comprises the steps of:

(A1) dividing the second document into a plurality of edited sections; and (A2) comparing each of the plurality of edited sections to the first section.

15. A method for producing a final document from an original document and an edited copy of the original document in response to user commands, the method comprising the steps of:

(A) comparing a first section of the original document with the edited document copy in response to a user command in order to identify a second section of the edited document copy which was a copy of the first section before editing;

(B) creating a consolidated document which simultaneously displays both the edited and unedited portions of each of the first and the second sections;

(C) determining changes between the first section and the second section;

(D) selecting desired changes to be made in the first section from the determined changes, in response to user commands; and (E) forming the final document which includes the unedited portions of the first section and the selected desired changes.

16. The method according to claim 15 wherein step D comprises the steps of:

(D1) displaying the first section on a display screen;

(D2) displaying the second sections on the display screen in a location physically adjacent to the display location of the first section; and (D3) visually displaying the determined changes in the second section display.

17. The method according to claim 16 wherein step A comprises the steps of:

(A1) dividing the edited document copy into a plurality of edited sections; and (A2) comparing each of the plurality of edited sections to the first section.

18. The method according to claim 17 wherein the first section and each of the plurality of edited sections is comprised of subsections and wherein step A2 comprises the step of:

(A2A) comparing the subsections in the first section with the subsections in each of the plurality of edited sections.

19. The method according to claim 18 wherein step A2A comprises the step of determining that one of the plurality of edited sections was a copy of the first section before editing when a predetermined number of adjacent subsections match.

20. The method according to claim 15 wherein step B comprises the step of:

(B1) inserting the second section into the consolidated document immediately after the first section.

21. The method according to claim 15 wherein step B comprises the step of:

(B2) marking the first and second section as a pair of sections.

22. The method according to claim 21 wherein step B further comprises the step of:

(B3) changing the first section to incorporate at least one of the changes in the second section in response to a user command.

23. A computer program product for producing a final document from a first document and a second document in response to user commands in a computer system having a memory, the computer program product comprising a computer usable medium having computer readable program code thereon, the computer readable program code including:

means responsive to a user command for comparing the first document with the second document in order to identify a first section of the first document which contains unedited portions identical to portions of a second section of the second document;

means responsive to the comparison of the first and second documents for creating a consolidated document in the memory, the consolidated document displaying both edited and unedited portions of each of the first and the second sections;

means responsive to the creation of the consolidated document for determining changes between the first section and the second section;

editing means controlled by user commands for selecting desired changes to be made in the first section from the determined changes; and means responsive to a user command for forming a final document which includes the unedited portions of the first section and the selected desired changes.

24. A computer program product for producing a final document from an original document and an edited copy of the original document in response to user commands, in a computer system having a memory, the computer program product comprising a computer usable medium having computer readable program code thereon, the computer readable program code including:

means responsive to a user command for comparing a first section of the original document with the edited document copy in order to identify a second section of the edited document copy which was a copy of the first section before editing;

means responsive to the identification of the second section for creating a consolidated document in the memory, the consolidated document displaying both edited and unedited potions of each of the first and the second sections;

means responsive to the creation of the consolidated document for determining changes between the first section and the second section;

editing means controlled by user commands for selecting desired changes to be made in the first section from the determined changes; and means responsive to a user command for forming the final document which includes the unedited portions of the first section and the selected desired changes.

* * * * *